March 17, 1931.  V. F. LYDEN  1,796,380
ANIMAL TRAP
Filed Feb. 21, 1929  2 Sheets-Sheet 1
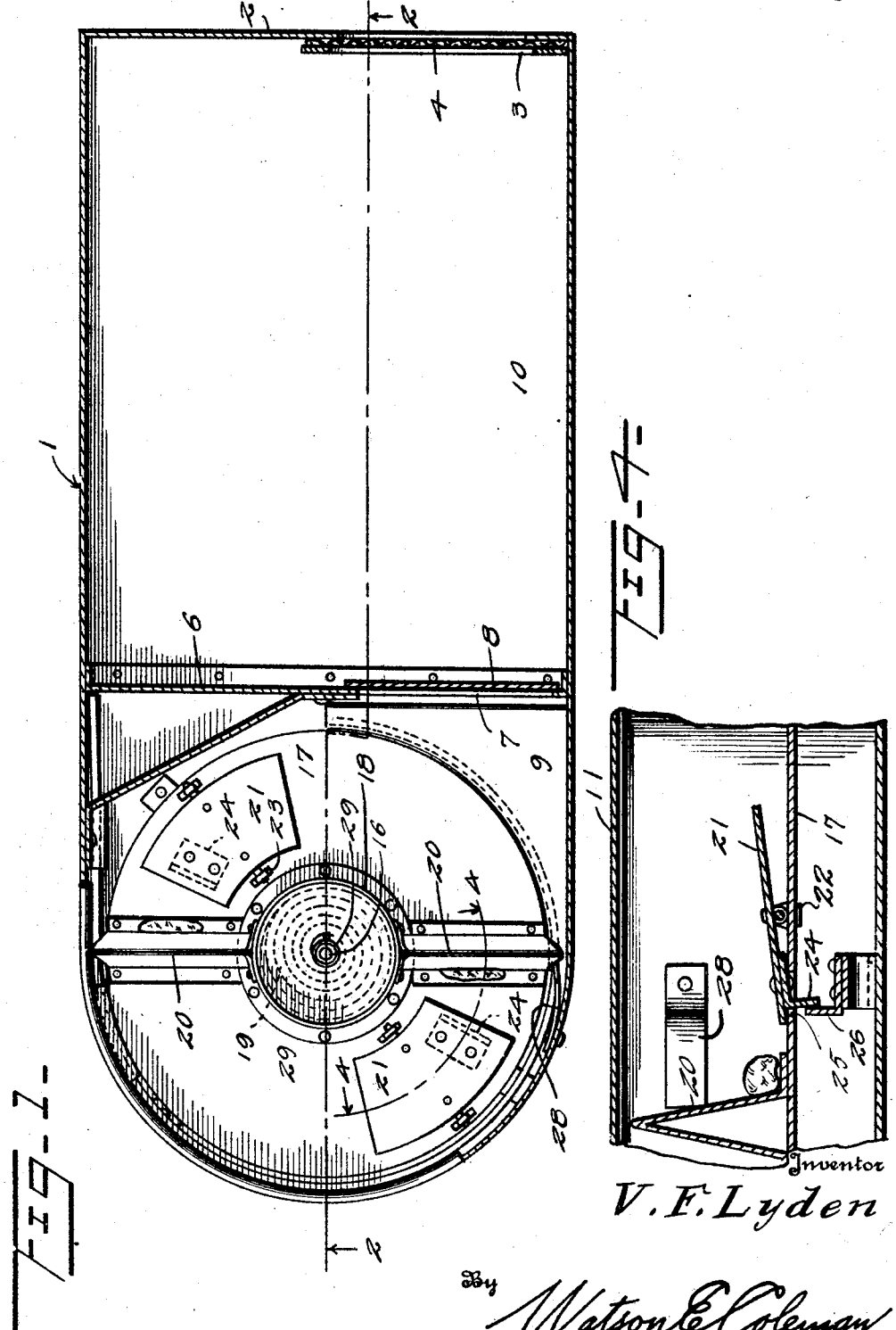
Inventor
V. F. Lyden
By Watson E. Coleman
Attorney March 17, 1931.  V. F. LYDEN  1,796,380
ANIMAL TRAP
Filed Feb. 21, 1929   2 Sheets-Sheet 2
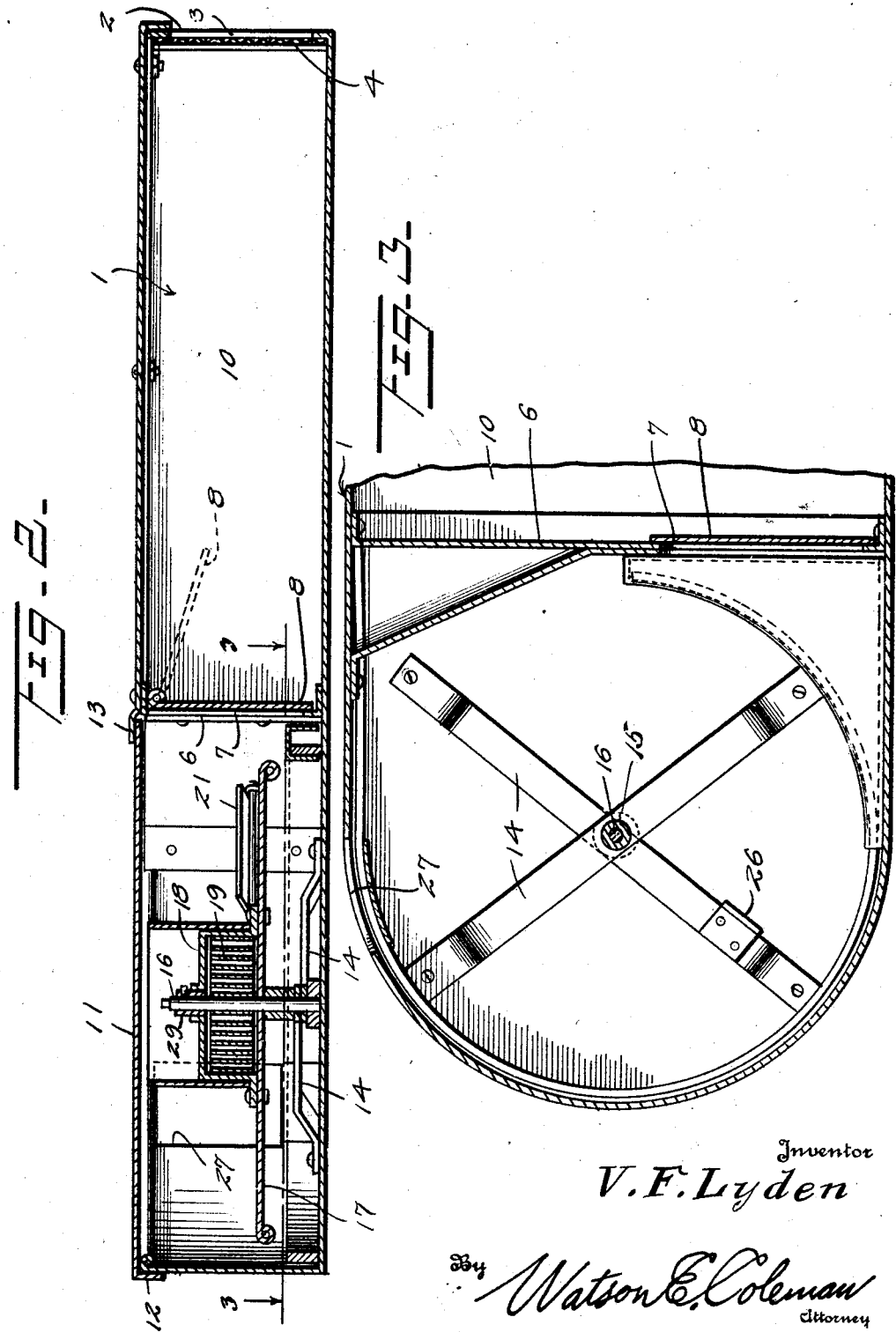
Inventor
V. F. Lyden
By Watson E. Coleman
Attorney Patented Mar. 17, 1931

1,796,380

UNITED STATES PATENT OFFICE

VINCENT F. LYDEN, OF MANNING, IOWA

ANIMAL TRAP

Application filed February 21, 1929. Serial No. 341,718.

This invention relates to the class of trapping and pertains particularly to an improved type of box trap for animals.

The primary object of the present invention is to provide an improved type of box trap wherein the operation of the trap is not dependent upon the movement of the bait or body carrying the bait, the animal being induced to enter the trap and set off or operate the same before the bait is reached.

Another object of the invention is to provide an improved type of box trap which will operate a number of times without attention and act to trap an animal at each operation.

Still another object of the invention is to provide a trap wherein each animal is forced from the portion of the trap housing the operating or active elements thereof so that a subsequent operation will not be interfered with by animals already in the trap.

Other objects and advantages of the invention will become apparent as the description of the same proceeds and the invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawings:—

Figure 1 is a horizontal sectional view taken longitudinally of the trap embodying the present invention.

Figure 2 is a vertical sectional view taken horizontally of the trap on line 2—2 of Figure 1;

Figure 3 is a horizontal sectional view of the mechanism housing end of the trap showing the table removed;

Figure 4 is a sectional view taken substantially upon the line 4—4 of Figure 1.

Referring to the drawings in detail the numeral 1 indicates the body of the box trap, the same being preferably of elongated relatively flat construction as shown, one end wall, as for example, the wall 2 extending square across the body and having a door opening 3 closed by a suitable door 4, in the present case a heavy wire door being shown to permit the trapper to see into the trap. The opposite end of the trap body is rounded as indicated at 5 and extending across the body inwardly of the rounded end is a partition 6 through one side of which a door opening 7 is formed, the opening being normally closed by the hanging door 8 which opens from the chamber 9 in which the trapping mechanism is positioned into the chamber 10 into which the animal is forced by the trapping mechanism when the same operates.

The chamber 10 is normally closed and access can be had thereinto only through the door 4 for the removal of animals. The chamber 9 may be opened by removal of the top 11 which, as shown, has a flange 12 which extends partly around the top and overlaps the side wall of the chamber and has one edge straight for engagement under the flange 13 at the inner end of the chamber and overlying the adjacent edge of the top of the chamber 10.

Extending across the bottom of the chamber 9 is a pair of heavy reenforcing bars 14 which are arranged in cross relation as shown, these bars being provided at the point where they intersect one another with an aperture 15 which forms a socket for the reception of a fixed vertical shaft 16.

Mounted upon and rotatable about the shaft 16 is a table 17 in the central portion of which is a circular housing 18 which houses a flat coiled ribbon spring 19. One end of this spring, the inner end, is fixed to the shaft 16, while the other end is attached to the casing 18 carried by the table 17 so that when the table is rotated in a clockwise direction the spring will be tightened about the shaft.

Extending radially from the casing 18 across the surface of the table and at diametrically opposite points thereon are the upstanding wings 20, these wings being of a height to position their top edges in close proximity to the under side of the top 11 of the chamber.

Mounted upon the table behind each of the wings 20 or, in other words, adjacent what is the following side of each wing when the table is rotated in a counter-clockwise direction by the action of the spring 19, is an oscillatable platform 21.

Each platform is mounted upon a shaft 22 which lies over the surface of the table and extends radially thereof each end of each shaft being mounted in a bearing 23. As is clearly shown in Figure 4 each shaft 22 extends across the central portion of the under face of a platform and the forward edge of each platform has depending therefrom a tongue 24 which normally tips this forward edge downwardly, the tongue extending through an opening 25 in the table in the manner shown in Figure 4.

The reinforcing bars 14 lying beneath the rotatable table 17 are so arranged that when the table is positioned with the wings directed transversely of the trap body dividing the chamber 9 in half, one of these bars will lie directly beneath each of the tiltable platforms 21. This bar is provided with an upstanding bracket at the end nearest the adjacent end of the trap body, as indicated at 26 and with the upstanding portion of this bracket the depending tongue 24 of the overlying platform 21 engages holding the platform against rotation by the spring 19.

The rounded portion of the wall of the chamber 9 of the trap is provided with an entrance opening 27 which permits an animal to enter the chamber 9 and to step onto the rotatable table.

This entrance opening is at the opposite side of the box from the platform 21 upon the same side of the wings 20 as the opening so that an animal entering must cross the chamber on the table in order to reach or come closer to the bait placed therein, the bait being preferably secured to the face of the wing 20 in front of the platform.

Before reaching the bait the animal steps upon the raised edge of the platform 21 lifting the tongue 24 from engagement with the bracket 26 thereby permitting the spring 19 to take control of the table and rotate it in a counter-clockwise direction one-half a revolution, or in other words, until the depending tongue of the other platform is swung around to the point where it will engage the upstanding bracket 26 and stop the platform's rotation. When this half revolution of the table takes place the animal will be turned with and upon the table and if he is not forcibly thrown therefrom by centrifugal action through the door 7 into chamber 10, he will be trapped between the wall 6 and the wings 20, from which position he will find his way to the door and pass therethrough into the chamber 10.

Secured to the inner face of the wall of the chamber 9 opposite the entrance opening 27 is a spring arm 28 which is forced toward the wall by the end of a wing 20 when the table is rotated and springs back to position behind the wing when the table is stopped by the tongue of a platform 21, thus preventing a reverse rotation of the platform by an animal after the spring 19 is run down.

As shown, the rotatable table 17 is held in position upon the shaft 16 by the application to the shaft of a collar 29 which overlies the casing 18 in which the spring is housed. The removal of the table may be accomplished by removing this collar and lifting the table and spring from the shaft.

From the foregoing description it will be readily seen that with a trap of this character a number of animals may be caught before a resetting of the trap is necessary and an important feature of this trap resides in the fact that the animal is permitted to get completely into the same before the bait is reached and the setting off of the trap is not dependent upon the animal taking a hold upon or touching the bait, therefore, no noises are caused which would be likely to scare the animal off before the springing of the trap is accomplished.

Having thus described my invention, what I claim is:—

A trap, comprising a casing, a vertical shaft therein, a table rotatable about said shaft and carrying a housing concentric therewith, a coiled control spring in the housing having one end secured to the shaft and the other end secured to the wall of the housing, a pair of diametrically opposed radial wings carried by the table normally dividing the casing, an entrance to the casing at one side of the dividing wings, oscillatable tripping platforms on the table each adjacent a wing and each carrying a depending member extending thru the table, and a stop beneath the table normally engaged by a depending platform member.

In testimony whereof I hereunto affix my signature.

VINCENT F. LYDEN.